(12) United States Patent
Bricheno et al.

(10) Patent No.: US 6,629,784 B1
(45) Date of Patent: Oct. 7, 2003

(54) WAVEGUIDES TO PHOTODETECTOR ASSEMBLY

(75) Inventors: Terry Bricheno, Great Sampford (GB); James Wilson Parker, Herts (GB)

(73) Assignee: Bookham Technology PLC, Abingdon (GB)

( * ) Notice: Subject to any disclaimer, the term of this patent is extended or adjusted under 35 U.S.C. 154(b) by 668 days.

(21) Appl. No.: 09/101,276

(22) PCT Filed: Mar. 6, 1997

(86) PCT No.: PCT/GB97/00606

§ 371 (c)(1),
(2), (4) Date: Jun. 30, 1998

(87) PCT Pub. No.: WO97/34180

PCT Pub. Date: Sep. 18, 1997

(30) Foreign Application Priority Data

Mar. 13, 1996 (GB) ................................. 9605320

(51) Int. Cl.[7] ............................................. G02B 6/255
(52) U.S. Cl. ........................................... 385/96; 385/43
(58) Field of Search ............................. 385/28, 39, 43, 385/96, 115

(56) References Cited

U.S. PATENT DOCUMENTS 5,138,677 A   8/1992   O'Shaugnessy et al. ...... 385/43

FOREIGN PATENT DOCUMENTS

| EP | 0 081 349 A | 6/1983 |
| JP | 58 048015 A | 3/1983 |
| JP | 02 039110 A | 2/1990 |
| WO | WO 93/08494 A | 4/1993 |

*Primary Examiner*—Thong Nguyen
*Assistant Examiner*—Eunchia Cherry

(57) ABSTRACT

An assembly for combining the outputs from a group of n single mode optical fibres on to the photosensitive surface of a photodetector (1) has an adiabatically tapered bundle (2) of fibres (3) the small end of which is fusion spliced to one end of a length (4) of multimode fibre whose other end is optically coupled with the detector (1) by means of a lens (5).

4 Claims, 1 Drawing Sheet

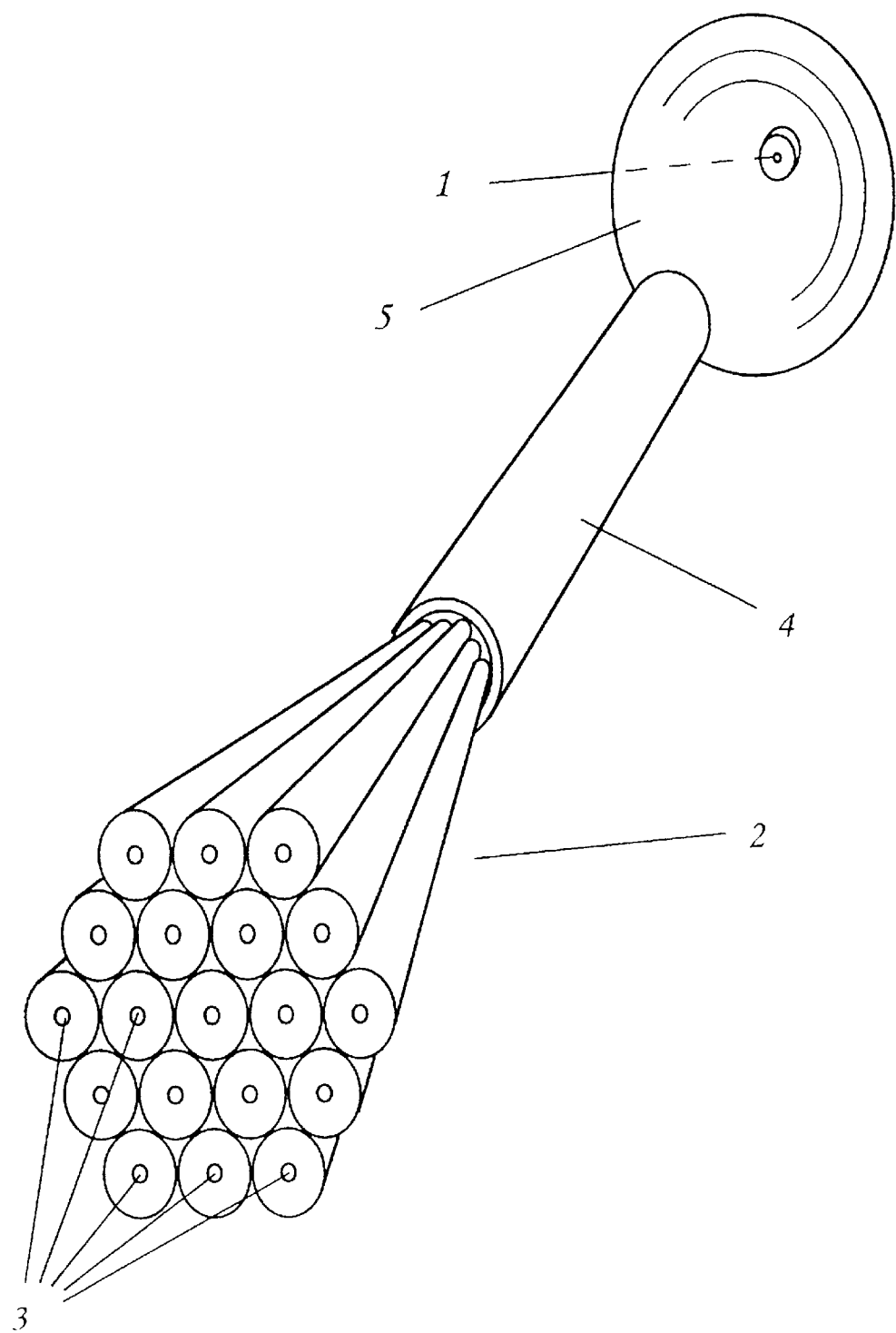

WAVEGUIDES TO PHOTODETECTOR ASSEMBLY

BACKGROUND TO THE INVENTION

This invention relates to the problem of combining the outputs from a group of single mode optical waveguides, typically optical fibres, efficiently upon the photosensitive surface of a photodetector.

Such a requirement may be found for instance in certain types of access network where a single photodetector is required to detect the output of any selected one from a set of n single mode fibres. Such a situation may arise for instance in fibre-in-the-home applications. Another application, one which will typically require a much faster photodetector, is in the construction of an ATM switch of high capacity from the optical interconnection of a set of smaller switches. Such a switch is for instance the subject of our co-pending application GB 2 289 813A in which the combining function is provided by a 1 to 16 integrated single mode waveguide radiative star arrangement which is operated in reverse direction so as to act as a combiner rather than as a splitter. It could alternatively have been provided by a tree of bifurcating splitters, similarly operated in reverse. In either instance the combining function is achieved with no insignificant loss: in the case of the tree structure this would be not less than 12 dB for a 1 to 16 tree.

An approach to providing reduced loss is described in U.S. Pat. No. 5,136,677. As described with particular reference to its FIG. 2, the approach involves progressively etching away most of the cladding glass from near one end of each of a set of fibres. These fibres are assembled into a bundle which is inserted through a silica tube that is dimensioned to freely receive the bundle. A quantity of potting compound is introduced into the bore of the tube. In this way the fibre ends are brought into a somewhat more tightly packed bundle that permits the free engagement around it of a second tube. This second tube has a smaller bore than that of the first and is dimensioned to fit inside the bore of the first tube. The function of the second tube is to bring the fibre ends into a still more tightly packed bundle than is achieved by the first tube alone. If necessary, one or more further tubes can be fitted, each nesting inside the end of its predecessor, each engaged freely around the bundle and protruding from that predecessor, and each serving to bring the fibres into an ever more tightly packed state than is achieved by the use of the preceding tube.

SUMMARY OF THE INVENTION

The present invention is directed to an assembly incorporating a combiner which exhibits significantly less loss than the equivalent tree or radiative star combiners described above, and achieves this objective without having to have recourse to etching of cladding glass from the individual waveguides, thereby avoiding the particular fragility problems associated without such etching and subsequent assembly of the etched fibres.

According to the present invention there is provided an assembly including a close-packed bundle of optical fibres having adiabatically tapered fibre cores, which fibres are single mode at the large end of the taper, wherein the small end of the taper is optically coupled with one end of a length of multimode fibre the other end of which multimode fibre is optically coupled with the photosensitive area of a photodetector.

The tapering process of the present invention is relatively easy to implement in a controlled way using progressive stretching. The fibres do not have to be separately tapered, but can all be tapered together once the fibres have been assembled into a bundle. In this way all the fibres of the bundle are subjected to identical tapering without engendering problems of excessive fragility. Furthermore the tapering can be employed to expand the modal spot size of, and hence reduce the far-field divergence of, the light issuing from the small end of the taper. This reduced divergence facilitates imaging on a small area, and hence fast, detector without excessive loss occasioned by numerical aperture limitations.

BRIEF DESCRIPTION OF THE DRAWINGS

There follows a description of an assembly embodying the invention in a preferred form, the description referring to the accompanying drawing, FIG. 1, which is a perspective schematic diagram of the assembly.

DETAILED DESCRIPTION OF A PREFERRED EMBODIMENT

The assembly of the accompanying drawing is an assembly designed for use in an ATM switch, and is required for directing the light emerging from any one of a group of n single mode fibres upon the photosensitive surface of a high-speed photodetector 1. In a specific example $16 \leq n \leq 19$, and the photosensitive area of the photodetector is about 25 μm diameter so as to be able to handle 10 Gbit/s traffic.

In addition to the photodetector 1, the basic components of the assembly are an adiabatically tapered bundle 2 of fibres 3 produced by the controlled stretching of a bundle of standard 125 μm diameter, c.0.1 NA single mode fibres, a length 4 of step-index multimode fibre, and an aspheric lens 5 for focusing the output of the multimode fibre 4 as a reduced size spot on the photosensitive area of photodetector 1. Such a lens 5 may be a lens designed for launching light from a semiconductor laser diode into single mode fibre.

To collect all the light emitted from the cores of all the n fibres on to the photosensitive area of the photodetector using standard imaging optics is not possible because the light emitted from the fibre ends is too divergent for it to be collected by any standard imaging optics providing the requisite approximately twenty-fold demagnification factor. The adiabatically tapered bundle 2 of fibres 3 provides a solution to this problem. This bundle is created by forming a hexagonally close-packed fused together assembly of n 125 μm diameter fibres, created for instance by bringing together into the array individually separated members of a ribbon of fibres. This assembly is then drawn down in a controlled manner to form two tapers joined by their smaller ends. Preferably these tapers are made using the progressive stretching technique described in GB 2 150 703 in which the bundle is longitudinally traversed several times through a localised hot zone using two translation stages, the leading one of which is moved at a controlled rate faster than the trailing one so as to promote plastic flow strain in the bundle where it is locally softened by the heat of the localised hot zone. By this means an adiabatic taper is formed over which the diameter of the bundle is reduced to about 90 μm. The precise profile of the taper is not critical provided that it is slow enough to be adiabatic. It is found that along the length of the taper from its large end to its small end the spot size associated with any individual fibre 3 gradually evolves, starting at about 10 μm and ending up between 10 and 15 μm. These spots are now much more closely spaced but, because the taper is adiabatic, the brightness is unchanged, and the 15 μm spot size provides a value of less than 0.08 for the N.A. of the emergent light.

The light emerging from the small end of the tapered bundle 2 is coupled into one end of the length 4 of step index multimode fibre. This multimode fibre has a core diameter slightly larger than the diameter of the small end of the fibre taper so as to be able to accept all the light emitted. One advantage of using this fibre is that it can form a convenient feed-through in the wall of an hermetically packaged detector. This is particularly the case if the fibre outer diameter is 125 $\mu$m to match that of standard transmission type single mode fibre for which well-proven feed-through technology is readily available. Another advantage of using this fibre is that, because it is multimode, light launched into one end over a small area of its core relatively rapidly evolves in its propagation along the fibre into a more nearly even distribution over the whole area of the core. This reduces the risk of the photodetector 1 affording different sensitivities to signals from different fibres 3 that could arise with direct imaging consequent upon the fact that such direct imaging would produce highly localised image spots on the photosensitive surface, some in localised areas of greater sensitivity than others.

Using a 125 $\mu$m diameter multimode fibre that has a 93 $\mu$m diameter undoped silica core surrounded by a fluorine doped cladding providing the fibre with a numerical aperture in the range 0.25 to 0.28, it has been found that a meter length of the fibre can be coiled without inducing any significant amount of mode coupling such as would significantly impair light collected by the lens 5, and that over that length of fibre the dispersion penalty is not significant for 10 Gbit/s signals. A preferred way of providing optical coupling between this fibre and the bundle is to form a fusion splice between the two components.

For slower speed applications using photodetectors with larger photosensitive areas, it is in some circumstances possible to dispense with the lens 5. In the case of slower speed applications there can be the additional advantage that the greater dispersion exhibited by a longer length 4 of multimode fibre can be tolerated, thereby enabling the detection point occupied by the detector 1 to be physically quite remote from the combining point occupied by the tapered bundle 2.

We claim:

1. An assembly including a close-packed bundle of optical fibres having adiabatically tapered fibre cores, which fibres are single mode at the large end of the taper, wherein the small end of the taper is optically coupled with one end of a length of multimode fibre the other end of which multimode fibre is optically coupled with the photosensitive area of a photodetector.

2. An assembly as claimed in claim 1, wherein the small end of the tapered bundle of fibres is optically coupled with said one end of the length of multimode fibre by means of a fusion splice.

3. An assembly as claimed in claim 1, wherein said other end of the length of multimode fibre is optically coupled with the photodetector by means of a lens.

4. An assembly as claimed in claim 3, wherein the small end of the tapered bundle of fibres is optically coupled with said one end of the length of multimode fibre by means of a fusion splice.

* * * * *